United States Patent [19]

Organek et al.

[11] Patent Number: 5,528,950

[45] Date of Patent: Jun. 25, 1996

[54] TRANSMISSION INERTIA BRAKE WITH BALL RAMP ACTUATOR

[75] Inventors: Gregory J. Organek, Livonia; Thomas A. Genise, Dearborn; Ronald K. Markyvech, Allen Park, all of Mich.

[73] Assignee: Eaton Corporation, Cleveland, Ohio

[21] Appl. No.: 412,254

[22] Filed: Mar. 28, 1995

[51] Int. Cl.⁶ ........................................................... F16H 3/12
[52] U.S. Cl. ............................................. 74/339; 192/4 A
[58] Field of Search ...................................... 192/4 R, 4 A, 192/7, 9; 74/339

[56] References Cited

U.S. PATENT DOCUMENTS

| | | | |
|---|---|---|---|
| 2,993,574 | 7/1961 | Gardner | 192/4 A |
| 3,581,590 | 6/1971 | Detra et al. | 74/339 |
| 3,648,546 | 3/1972 | McNamara et al. | 74/339 X |
| 4,186,618 | 2/1980 | Richards | 74/339 |
| 4,433,762 | 2/1984 | Prokop et al. | 192/4 A |
| 5,353,901 | 10/1994 | Jacques et al. | 192/9 X |

Primary Examiner—Richard M. Lorence
Attorney, Agent, or Firm—Loren H. Uthoff, Jr.; Howard D. Gordon

[57] ABSTRACT

An inertia brake is coupled to a rotating shaft of a vehicle transmission where a ball ramp actuator energized by an electrical coil is used to load a clutch pack which frictionally creates a braking torque on the rotating shaft to facilitate synchronous gear engagement. A control system includes an electronic control unit and an inertia brake controller where a variety of sensors provide signals to the electronic control unit uses the sensor signals to generate a deceleration signal to the inertia brake controller which in turn generates and supplies the appropriate level of electrical current to the electrical coil which is used to energize the ball ramp actuator thereby accurately controlling the rate of shaft rotational deceleration.

20 Claims, 3 Drawing Sheets

TRANSMISSION INERTIA BRAKE WITH BALL RAMP ACTUATOR

BACKGROUND OF THE INVENTION

1. Field of the Invention

The present invention relates to an inertia brake for a vehicle transmission. More specifically, the present invention relates to an inertia brake for a vehicle transmission where a ball ramp actuator is used to load a clutch pack according to a control signal.

2. Description of the Prior Art

Transmissions that have their shifting accomplished using actuators controlled by a microprocessor in response to a driver request and various sensor inputs have been developed and are just now entering the marketplace.

Also, sophisticated electronic transmission controls are being used to control shift actuators that act to shift a gear change transmission independent of the driver. Shifting of such a multiple speed gear transmission without synchronizers requires that the speeds of the gears that are to be meshed be matched so that a smooth gear tooth engagement can take place. A gear on a spinning shaft that exceeds the desired mesh speed (synchronous speed) must be allowed to slow before the gear shift can be effectuated. Thus, while the shaft is slowing, there is no driveline link between the engine and the transmission. If the vehicle is on an upgrade, especially when pulling a loaded trailer, disconnection of the transmission from the engine allows the vehicle to rapidly slow. Thus, while waiting for the transmission gear shaft to slow to synchronous speed, the vehicle itself slows enough that the gear ratio originally selected for the shift is no longer appropriate.

The next shift must then be calculated and selected by the electronic control package. Once again, as the electronic controller waits for the gear shaft to slow to synchronous, the vehicle continues to rapidly decelerate until the second selected downshift is no longer appropriate. Eventually, the vehicle comes to a stop without a successful downshift being accomplished. Problems in quickly executing a shift due to the length of time required for a transmission gear shaft to decelerate to synchronous speed results in operational problems as heretofore described. Also, when a conventional transmission without an electronic control system is shifted, an inertia brake allows shifts to be made more rapidly for improved driver control of the vehicle.

A transmission countershaft and gear assembly having a high rotational inertia is accelerated with the engine and then a shift requires the shaft to be released usually by release of a master clutch. Another gear ratio cannot be selected until the gear on the countershaft reaches synchronous speed with a gear on the mainshaft.

To date, various traditional type braking devices have been used to release the rotational speed of a spinning transmission shaft. For example, shoe type brakes and disc clutches using springs for loading of a clutch pack have been used. The inertia brake devices can be connected to any shaft that is connected to rotate with the input shaft of the transmission including one or more countershafts.

SUMMARY OF THE INVENTION

The present invention provides for the braking and subsequent slowing of the rotation of a selected transmission shaft by means of an inertia brake having a clutch pack comprised of a plurality of clutch friction plates which are clamped together by means of a ball ramp actuator. The degree of activation of the ball ramp actuator, and hence the clutch pack, is controlled by a coil which electromagnetically pulls an armature into frictional contact with the coil housing thereby providing a braking torque to the control ring of the ball ramp actuator. The ball ramp actuator expands in its axial dimension when such a braking force is applied to the control ring which causes a clamping force to be applied to the clutch pack. A detailed disclosure of the construction and operation of a ball ramp actuator can be found in U.S. Pat. Nos. 2,091,270; 2,605,877; 2,649,941; 3,000,479 and 5,372,106, the disclosures of which are hereby incorporated by reference. The response time of the ball ramp actuator is quite rapid and the actuator has the unique characteristic of generating a very high axial force as compared to the braking force applied to the control ring, typically in a ratio of 50:1. The clutch pack is made up of a plurality of clutch stationary friction plates grounded to the housing and a like number of clutch rotating friction plates splined to rotate with the input shaft of a change gear transmission which combine to apply a rotational retarding torque to the spinning transmission input shaft to facilitate gear changes.

The inertia brake of the present invention can be applied to any freely rotating shaft in the transmission that requires speed reduction to effectuate a gear ratio change. Thus, application of the inertia brake to the transmission input shaft and/or countershaft(s) or even to a power take-off would be possible to assist in rapid gear ratio changes.

The use of the present invention would allow a transmission gear change to be completed more rapidly and more reliably especially when sophisticated automatic electronic controls are utilized to do the shifting. As discussed supra, the transmission shifting controller cannot select the correct gear when the vehicle is on a steep grade if the transmission cannot be brought into synchronization quickly to complete a shift. The present invention allows the transmission shaft(s) to be quickly slowed and brought into synchronization so that a shift can be quickly and reliably completed. The use of a ball ramp actuator to axially load the clutch pack provides a device with a more rapid response with low energy consumption and reduced packaging size for the forces created as compared to prior art devices.

One provision of the present invention is to provide a compact, rapid response inertia brake for slowing a rotating transmission shaft.

Another provision of the present invention is to provide a compact, rapid response inertia brake for slowing a rotating transmission shaft utilizing a ball ramp actuator to load a clutch pack.

Another provision of the present invention is to provide a compact, rapid response inertia brake for slowing a rotating transmission shaft utilizing a ball ramp actuator to load a plurality of friction plates where some of the friction plates are connected to a transmission shaft and others are connected to ground.

Another provision of the present invention is to provide a transmission inertia brake utilizing a ball ramp actuator to load a clutch pack where a coil creates an electromagnetic field to create a braking force on a control ring.

Still another provision of the present invention is to provide a transmission inertia brake utilizing a ball ramp actuator to load a clutch pack when a coil creates an electromagnetic field to attract and force an armature into frictional contact with a friction surface thereby creating a braking force on a control ring.

DETAILED DESCRIPTION OF THE PREFERRED EMBODIMENT

Figure 1:
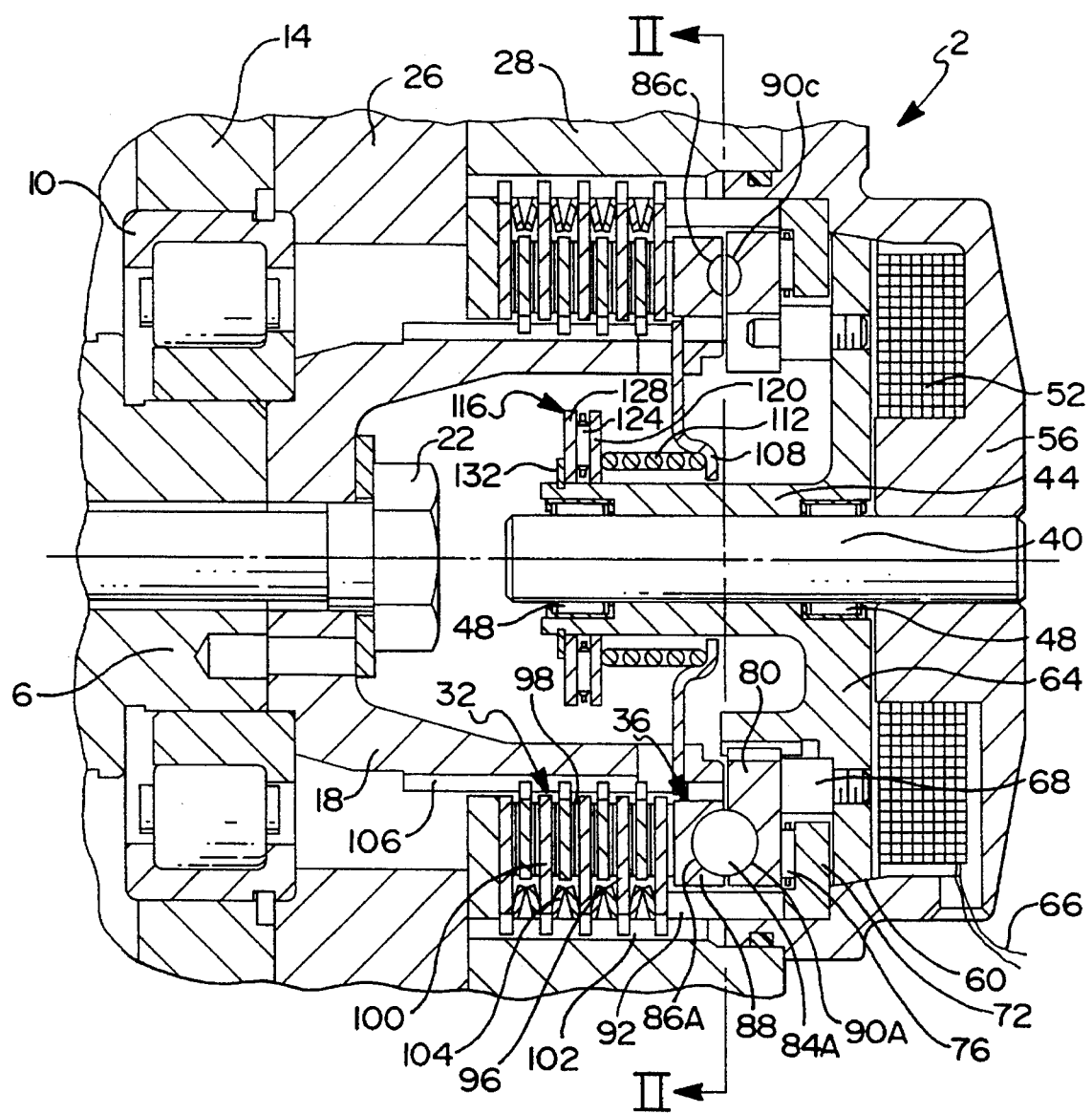
FIG. 1 is a cross-sectional view of the inertia brake of the present invention.

In this disclosure, certain terminology will be used in the following description for convenience in reference only and will not be limiting. For example, the terms "forward" and "rearward" will refer to directions forward and rearward of the inertia brake as installed on a transmission. The terms "rightward" and "leftward" will refer to directions in the drawings in connection with which the terminology is used. The terms "inwardly" and "outwardly" will refer to directions toward and away from, respectively, the geometric center of the brake assembly of the present invention. The terms "upward" and "downward" will refer to directions as taken in the drawings in connection with which the terminology is used. All foregoing terms mentioned above include the normal derivatives and equivalents thereof. The term transmission as used herein shall include all types of gear change transmissions including single countershaft and twin countershaft types.

Now referring to FIG. 1 of the drawings, a cross-sectional view of the inertia brake of the present invention is shown. An inertia brake 2 of the present invention is attached to a rotating transmission shaft such as transmission countershaft 6 which is geared to rotate with a transmission input shaft 160 (see FIG. 5). The transmission countershaft 6 carries a plurality of transmission gears (see countershaft gearset 172 in FIG. 5) which are selectively meshed with a plurality of mainshaft gears (see mainshaft gearset 174 in FIG. 5). At certain points of time during which a transmission shift is being made, the transmission countershaft 6 is frequently rotating and continues to rotate due to the rotational inertia of the assembly. The function of the inertia brake 2 is to provide a braking force to the transmission countershaft 6 thereby slowing the rotational speed of the transmission countershaft 6 such that the shifting of the countershaft gears so as to mesh with a selected mainshaft gear can take place or in another shifting technology a sliding clutch is used to engage the desired mainshaft gear which is in constant mesh with a countershaft gear. The inertia brake slows both the countershaft and input shaft as the sliding clutch can engage the mainshaft gear. Operation of this type of change gear transmission is described in U.S. Pat. No. 4,640,145, the disclosure of which is hereby incorporated by reference. The transmission countershaft 6 is supported in the transmission housing 14 by a countershaft bearing 10 which allows the transmission countershaft 6 to freely rotate relative to the transmission housing 14. Attached to one end of the transmission countershaft 6 is an output yoke 18 which is retained by retention bolt 22 and nonrotatably connected such that the output yoke 18 is nonrotatably connected to the transmission countershaft 6. The mounting plate 26 provides support to the inertia brake housing 28. The mounting plate 26 and the inertia brake housing 28 can be formed on part of the transmission case 14.

Contained within the inertia brake housing 28 is a clutch pack 32 and a ball ramp actuator 36 which is used to supply axial load to the clutch pack 32. A pilot shaft 40 lying on the rotational centerline of the transmission countershaft 6 and supported in coil housing 56 provides the support for a plurality of components necessary for the proper operation of the inertia brake 2. Once such component is the friction plate 44 which rotates on two support bearings 46 and 48 which ride on the pilot shaft 40. An electrical coil 52 is contained within the coil housing 56 where the pilot shaft 40 is pressed into and supported by the coil housing 56. The coil housing 56 is in turn attached to the inertia brake housing 28 which is attached to the mounting plate 26 which is attached to the transmission housing 14. Again, the inertia brake housing 28 and the mounting plate 26 can be formed as one piece with the transmission case 14.

The coil housing 56 contains a friction surface 60 against which the friction plate 64 interacts. The friction surface 60 is angled relative to the axis of rotation of the friction plate 64 to lower the axial force required to generate a given torque on the friction plate 64. Likewise, the peripheral surface of the friction plate 64 which contacts the friction surface 60 is similarly angled (thereby establishing a contact angle) to form what is known in the art as a cone clutch. The friction plate 64 is part of the armature 44 which is electromagnetically attracted to the coil 52 when an electrical current is introduced through electrical connector 66. The electromagnetic force induced in the armature 44, specifically in the portion of the armature 44 identified as the friction plate 64, causes the armature 44 to move axially towards the coil 52 thereby frictionally loading the friction plate 64 against the friction surface 60 formed on the coil housing 56. In an alternative embodiment, the friction surface 60 could be formed on the inside of the inertia brake housing 28.

The friction plate 64 is connected to a control ring 80 of the ball ramp actuator 36 through a plurality of drive pins 68. Thus, the control ring 80 rotates with the friction plate 64 and any braking action induced in the armature 44 through the friction plate 64 is transferred to the control ring 80 of the ball ramp actuator 36. The control ring 80 is axially supported by the thrust plate 72 through a thrust bearing 76. Formed in the control ring 80 are a plurality of grooves (most commonly three or more) which extend circumferentially in face of the control ring 80 and have a variable axial depth along their length. Two of the three grooves are shown in FIG. 1 as control groove 90A and control groove 90C. Rolling element 84A, which is spherical in shape, rolls along the length of the control groove 90A which varies in depth as will be described infra in reference to FIG. 2. The rolling element 84A simultaneously rolls along an activation groove 86A which is formed in activation ring 88 where the activation grooves 86A, 86B and 86C (see FIG. 2) are substantially identical in shape and in radial position to the corresponding control grooves 90A, 90B and 90C formed in the control ring 80. Also shown in FIG. 1 is activation groove 86C. In the operation of the ball ramp actuator 36, as the control ring 80 is rotated relative to the activation ring 88, the rolling elements 84A, 84B and 84C roll along their respective activation grooves 86A, 86B and 86C and also their respective control grooves 90A, 90B and 90C. Since both the activation grooves 86A, 86B and 86C and the corresponding control grooves 90A, 90B and 90C vary in depth, the axial separation between the control ring 80 and the activation ring 88 changes depending on the position of the rolling elements 84A, 84B and 84C in their respective activation and control grooves. A more detailed description of the elements of the ball ramp actuator 36 is presented infra with reference to FIGS. 2 and 3. Also, detailed description of ball ramp actuators can be found in U.S. Pat. Nos. 2,091,270; 2,605,877; 2,649,941; 3,000,479 and 5,372,106.

The spacer ring 92 is axially sized to be slightly wider than the width of the ball ramp actuator 36 when in a collapsed, nonenergized state. The spacer ring 92 thus provides for the axial separation of the clutch pack 32 from the actuation ring 88 and the thrust bearing 76 from the control ring 80 so that frictional drag between them does not result in activation of the ball ramp actuator 36. When the ball ramp actuator 36 is energized by the coil 52, the axial separation between the control ring 80 and the activation ring 88 increases. The control ring 80 is held in axial position by the thrust plate 72 and the thrust bearing 76 while the activation ring 88 presses against the clutch pack 32. The clutch pack 32 is made up of a plurality of drive plates 96 and stationary plates 100 where the drive plates 96 have frictional material 98 formed on their face surfaces where they contact the stationary plates 100 and are arranged such that the drive plates 96 alternate with the stationary plates 100. In an alternate embodiment, the stationary plates 100 could carry the frictional material 98. The drive plates 96 are notched so as to engage splines 106 formed on the yoke 18 which is attached to the transmission countershaft 6. The stationary plates 100 are notched to engage splines 102 formed in the inertia brake housing 28. The drive plates 96 are separated from the stationary plates 100 with spacer springs 104 which are shown as Belville springs which function to maintain a gap between the friction material 98 on the drive plates 96 and the stationary plates 100 until an axial load is introduced by the ball ramp actuator 36. Axial movement of the ball ramp actuator 36 causes the spacer rings 104 to become compressed thereby allowing the friction material 98 formed on the drive plates 96 to functionally engage surfaces of the stationary plates 100. In this manner, a frictional coupling is produced between the transmission output yoke 18 and the stationary inertia brake housing 28 which causes the rotation of the transmission countershaft 6 to decelerate at a rate depending on the axial force generated by the ball ramp actuator 36 and the degree of frictional coupling between the drive plates 96 and the stationary plates 100. The inertia brake 2 is designed to operate in an oil bath thereby providing lubrication to the various rotating elements where the frictional material 98 formed on the drive plates 96 is designed to provide the proper coefficient friction in an oil environment when loaded against the stationary plates 100.

The spring plate 108 pilots on the armature 44 and extends to contact and transfer an axial force to the activation ring 88 where the axial force is generated by a return spring 112 acting on the spring plate 108. The return spring 112 has one end which contacts the spring plate 108 and a second end which contacts a spring bearing 116 specifically at bearing plate 120 which reacts against a plurality of rollers 124 and a bearing plate 128 where the bearing plate 128 is axially restrained to the armature 44 by a circlip 132. The spring bearing 116 allows free relative rotation between the return spring 112 (which rotates with the spring plate 108 and the activation ring 88) and the armature 44. Thus, in operation, the spring plate 108 forces the activation ring towards the control ring 80 thereby maintaining contact between the rolling elements 84A, 84B and 84C to both the control ring 80 and the activation ring 88. This preloads the ball ramp actuator 36 to prevent skidding of the rolling elements 84A, 84B and 84C in their respective activation grooves 86A, 86B and 86C and their respective control grooves 90A, 90B and 90C. The return spring 112 also functions to provide an axial force on the ball ramp actuator 36 to unload the clutch pack 32 when the coil 52 is not energized.

Figure 2:
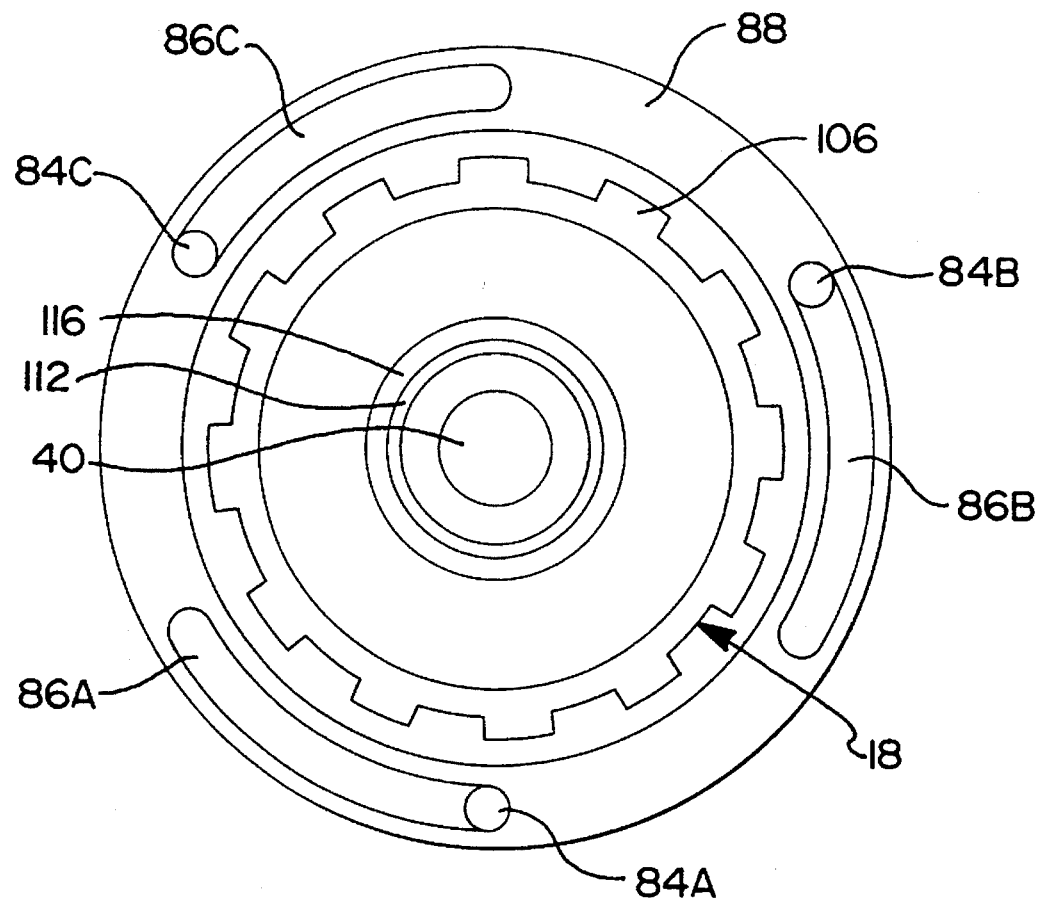
FIG. 2 is a sectional view of the inertia brake of the present invention taken along line II—II of FIG. 1.
Figure 3:
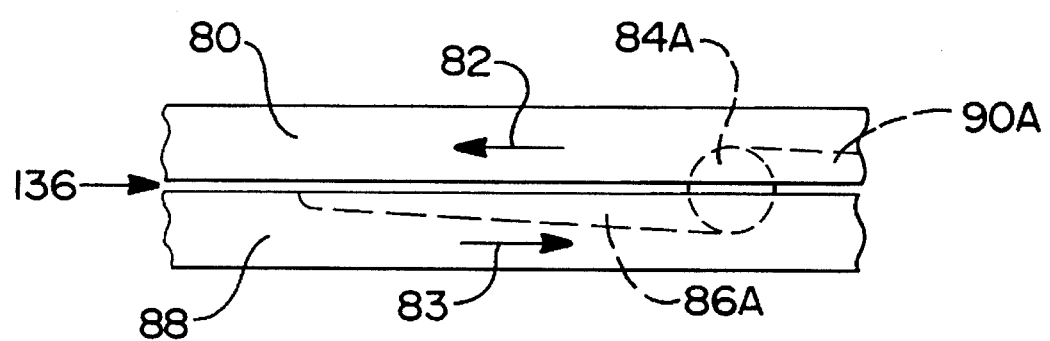
FIG. 3 is a partial end view of a control ring and an activation ring of the ball ramp actuator of the present invention.

Now referring to FIGS. 2 and 3 of the drawings, a partial sectional view of the inertia brake of the present invention taken along line II—II of FIG. 1 is shown. FIG. 2 clearly illustrates the positioning and operation of the rolling elements 84A, 84B and 84C as they engage their respective activation grooves 86A, 86B and 86C where the relative rotation of the control ring 80 with respect to the activation ring 88 is most clearly illustrated by reference to FIG. 3 which is a partial end view of the control ring 80 and the activation ring 88 of the ball ramp actuator 36 of the present invention. Referring again to FIG. 2, the pilot shaft 40 is surrounded by the return spring 112 and the spring bearing 116. The hub splines 106 formed in the output yoke 18 are clearly shown where the drive plates 96 would be notched to engage same. Rolling element 84A rolls along activation groove 86A and its location along activation groove 86A depends on the force generated by the friction plate 64 as it engages the friction surface 60 when the coil 52 is energized thereby electromagnetically attracting the armature 44 towards the coil 52 and the coil housing 56. If the countershaft 6 is rotating, this will cause relative rotation between the control ring 80 and the activation ring 88 causing the rolling element 84A to translate along the activation groove 86A. Likewise, the rolling element 84B reacts in a similar manner and translates along the activation groove 86B and the rolling element 84C translates along the activation groove 86C. This results in an increase in the axial separation between the control ring 80 and the activation ring 88 thereby axially loading the clutch pack 32 which generates a retarding force to the rotating output yoke 18..

Now referring to FIG. 3, as the control ring 80 is rotated relative to the activation ring 88 as indicated by the arrows 82 and 83 in the drawing, the rolling element 84A rolls along the activation groove 86A and in a similar manner along the control groove 90A thereby increasing the gap 136 between the control ring 80 and the activation ring 88. Both the control groove 90A and the activation groove 86A vary in depth throughout their length where the rolling element 84A is shown in the position where the ball ramp actuator 36 is not energized and has been returned to the nonenergized state by the return spring 112 thereby providing for minimization of the separation gap 136. When the coil 52 is energized, the braking effect produced by the friction plate 64 is transferred by the drive pins 68 into the control ring 80 causing the control ring 80 to rotate relative to the activation ring 88 causing the rolling element 84A to roll along both the activation groove 86A and the control groove 90A. This increases the separation gap 136 which loads the clutch pack 32 providing a frictional braking action to the rotation of the transmission countershaft 6. Once again, reference is made to U.S. Pat. Nos. 2,091,270; 2,605,877; 2,649,941; 3,000, 479 and 5,372,106 for additional details of construction and operation of similar ball ramp actuators.

Figure 4:
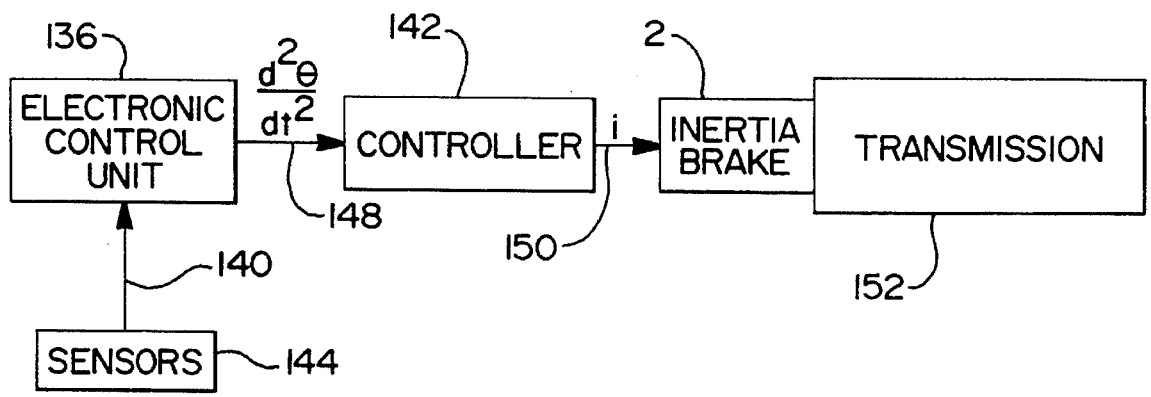
FIG. 4 is a schematic diagram of a closed loop control system of the ball ramp actuated inertia brake of the present invention.

FIG. 4 is a schematic diagram of a closed loop control system as applied to the ball ramp actuated inertia brake of the present invention. An electronic control unit 136 processes a variety of sensor output signals 140 from sensors 144 such as engine speed, vehicle speed, power demand, gear ratio, etc. to calculate the desired rate of deceleration of the rotation of the transmission countershaft 6 to effectuate the desired or calculated gear ratio shift in the transmission 152. Thus, the output sensor signals 140 of a variety of vehicle sensors 144 are processed by the electronic control unit 136 which outputs a desired deceleration rate signal 148 of the transmission countershaft 6 in the form of a deceleration rate signal 148 which is transferred to an inertia brake controller 132. The inertia brake controller 132 in turn generates an electrical current signal 150 labeled as "i" in FIG. 4 which is electrically connected through electrical connector 66 to the inertia brake 2. In this manner, the desired rate of the deceleration to obtain the desired rotation speed of the transmission shaft (which can be a mainshaft or one or more transmission countershafts) that is required to effectuate a rapid and dependable transmission gear change is calculated by the electronic control unit 136 based on the outputs of a variety of sensors 144. The electronic control unit 136 in turn generates a deceleration rate signal 148 that is transmitted to an inertia brake controller 142. The inertia brake controller 142 then generates an electrical current signal 150 which is fed to the coil 52 which energizes the ball ramp actuator 36 where the ball ramp actuator 36 can be energized or de-energized to produce the desired loading of the clutch pack 32 to provide the desired deceleration rate of the transmission countershaft 6 as calculated by the electronic control unit 136. Thus, instead of simply turning the inertia brake 2 on and then attempting to effectuate a gear shaft at whatever transmission countershaft deceleration rate is produced, the deceleration can be controlled by controlling the electrical current "i" to the electrical coil 52 which controls the frictional interaction between the friction plate, 64 and the friction surface 60 formed on the coil housing 56 which in turn controls the activation level of the ball ramp actuator 36.

Figure 5:
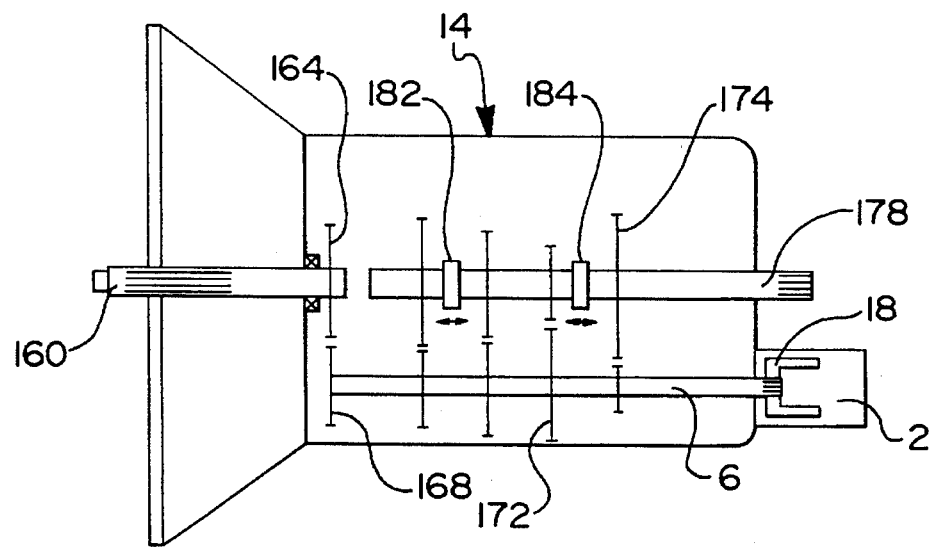
FIG. 5 is a schematic diagram of the inertia brake of the present invention mounted on a transmission.

FIG. 5 is a schematic diagram of the inertia brake 2 of the present invention mounted to a transmission case 14 and connected to a rotating transmission countershaft 6 for improved shifting. The transmission case 14 supports an input shaft 160 which is rotated by a prime mover such as an engine and is coupled and in turn rotates the countershaft 6 through meshing of the input drive gear 164 and the countershaft drive gear 168. The input drive gear 164 is nonrotatably attached to the input shaft 160 and the countershaft drive gear 168 is nonrotatably attached to the countershaft 6. Thus, the countershaft 6 rotates with the input shaft 160.

The inertia brake 2 is mounted to the transmission case 14 and is connected to the countershaft 6 by the output yoke 18. When activated by the inertia brake controller 142, the inertia brake 2 acts to slow the rotation of the countershaft 6 and the input shaft 160 and consequently the countershaft gearset 172 shown as a schematic representation. The countershaft gearset 172 consists of a plurality of gears nonrotatably attached to the countershaft 6 and are constantly meshed with the mainshaft gearset 174 which consists of a plurality of gears rotatably attached to a mainshaft 178. The mainshaft 178 is attached to the vehicle driveline outside of the transmission case 14.

Shifting of the transmission is accomplished by moving the front sliding clutch 182 or the rear sliding clutch 184 into engagement with a selected mainshaft gear from the mainshaft gearset 174 where the sliding clutch 182 and 184 serve to rotationally lock the selected gear to the mainshaft 178 thereby completing a path of torque transfer from the input shaft 160 into the countershaft 6, into the mainshaft 178 and to the vehicle driveline. Operation of such a transmission is described in U.S. Pat. No. 4,640,145. While the preferred embodiment is described with reference to a single countershaft type of change gear transmission, the inertia brake of the present invention is equally adaptable to any type of change gear transmission where the shifting can be improved by applying a breaking torque to a spinning shaft. This includes, but is not limited to a multiple countershaft transmission.

Although the present invention has been described in its preferred form with a certain degree of particularity, it is understood that the present disclosure of the preferred embodiment has been made only by way of example, and that numerous changes in the detail construction and combination and arrangement of the parts may be resorted to without departing from the spirit and the scope of the invention as hereinafter claimed.

We claim:

1. An inertia brake for braking the rotation of a freely rotating shaft in a transmission comprising:

a transmission housing containing a plurality of shafts and gears for changing the gear ratio in a vehicle driveline;

a housing having a cavity therein, said housing attached to said transmission housing;

a transmission shaft having a plurality of gears attached thereto substantially contained within said transmission housing;

a clutch pack having a plurality of drive plates nonrotatably attached to said transmission shaft and a plurality of stationary plates attached to said transmission housing;

a ball ramp actuator for loading said clutch pack comprising: an activation ring adjacent to said clutch pack where axial movement of said activation ring results in a loading and an unloading of said clutch pack; a control ring disposed adjacent to said activation ring, said control ring and said activation ring having opposed faces provided with circumferentially extending grooves, said grooves as at least three opposed pairs of grooves having portions of varying depth having a maximum depth at one end and a minimum depth at an opposite end, and rolling members disposed one in each opposed pair of grooves, the grooves on said activation ring and said control ring being arranged so that relative angular movement of said activation ring and said control ring from a starting position thereof causes axial movement of said activation ring away from said control ring to axially load said clutch pack;

an armature nonrotationally coupled to said control ring, said armature having a friction plate in frictional contact with a frictional surface formed in said housing for applying an activating force to said control ring;

an electrical coil disposed adjacent to said friction plate, said friction plate being forced against said friction surface by an electromagnetic field generated by said coil.

2. The inertia brake of claim 1, wherein said rolling members are spherical in shape.

3. The inertia brake of claim 1, further comprising a thrust plate supported by said housing, and a thrust bearing disposed between said thrust plate and said control ring for absorbing thrust loads.

4. The inertia brake of claim 3, further comprising a spacer ring having a width to provide axial separation between said clutch pack and said activation ring and between said thrust bearing and said control ring for preventing inadvertent actuation of said ball ramp actuator due to frictional drag.

5. The inertia brake of claim 1, further comprising a spring plate attached to said activation ring, and a spring acting against said spring plate forcing said activation ring away from said clutch pack.

6. The inertia brake of claim 1, wherein said stationary plates are positioned in an alternating configuration with said drive plates.

7. The inertia brake of claim 6, wherein said drive plates have a front surface and a back surface both covered with a friction material where said friction material contacts said adjacent stationary plates.

8. The inertia brake of claim 1, further comprising a control system having an electronic control unit for processing a variety of sensor signals and outputting a deceleration signal to an inertia brake controller where said inertia brake controller generates a current signal that is connected to and energizes said coil.

9. A gearchange transmission having an inertia brake comprising:
  a transmission having a transmission case with a cavity formed therein, said transmission having a first gearset carried by a rotating transmission countershaft meshed with a second gearset carried by a rotating transmission mainshaft all contained substantially within said cavity;
  a clutch pack having a plurality of drive plates nonrotatably attached to said transmission countershaft and a plurality of stationary plates attached to said transmission case;
  a ball ramp actuator for loading said clutch pack comprising: an activation ring adjacent to said clutch pack where axial movement of said activation ring results in a loading and an unloading of said clutch pack; a control ring disposed adjacent to said activation ring, said control ring and said activation ring having opposed faces provided with circumferentially extending grooves, said grooves as at least three opposed pairs of grooves having portions of varying depth having a maximum depth at one end and a minimum depth at an opposite end, and rolling members disposed one in each opposed pair of grooves, the grooves on said activation ring and said control ring being arranged so that relative angular movement of said activation ring and said control ring from a starting position thereof causes axial movement of said activation ring away from said control ring to axially load said clutch pack;
  activation means for applying a braking torque to said control ring.

10. The gearchange transmission of claim 9, wherein said clutch pack is comprised of a plurality of drive plates connected to said transmission countershaft interdigitated with a plurality of stationary plates connected to said transmission case.

11. The gearchange transmission of claim 10, wherein said drive plates have a frictional material applied to a first surface and a second surface of each of said drive plates which frictionally interact with said stationary plates.

12. The gearchange transmission of claim 9, wherein said activation means comprises an armature having a friction plate coupled to said control plate where said friction plate contacts a friction surface and applies a braking torque to said control plate and wherein a coil disposed adjacent to said armature electromagnetically attracts said armature causing said friction plate to contact said friction surface.

13. The gearchange transmission of claim 12, wherein said friction surface is formed in a coil housing, where said coil housing is attached to said transmission case and has a cavity formed therein for holding said coil.

14. The gearchange transmission of claim 10, further comprising a spacer ring disposed to provide axial separation between said clutch pack and said ball ramp actuator when said ball ramp actuator is in a nonenergized state.

15. The inertia brake of claim 1, wherein said friction plate contacts said friction surface at a contact angle an extension of which intersects an axis of rotation of said friction plate.

16. The inertia brake of claim 1, wherein said friction plate contacts said friction surface such that increased axial movement of said friction plate toward said coil increases said activating force on said friction plate.

17. The inertia brake of claim 16, wherein said friction plate in combination with said friction surface form a cone clutch.

18. The gearchange transmission of claim 12, wherein said friction plate contacts said friction surface such that increased axial movement of said friction plate toward said coil increases said braking torque on said friction plate.

19. The gearchange transmission of claim 12, wherein said friction plate in combination with said friction surface form a cone clutch.

20. The gearchange transmission of claim 12, wherein said friction plate contacts said friction surface at a contact angle an extension of which intersects an axis of rotation of said friction plate.

* * * * *

UNITED STATES PATENT AND TRADEMARK OFFICE
CERTIFICATE OF CORRECTION

PATENT NO.   : 5,528,950
DATED        : June 25, 1996
INVENTOR(S)  : Gregory J. Organek, Thomas A. Genise, William J. Mack, Ronald K. Markyvech,
               David M. Preston, Donald M. Stout, James M. Brown and Gerald D. Damon It is certified that error appears in the above-identified patent and that said Letters Patent is hereby corrected as shown below:

Column 4,
Lines 11-12, replace "friction plate 44" with -- friction plate 64 --.
Line 12, delete "46 and".
Line 42, delete "136".

Signed and Sealed this

Nineteenth Day of November, 2002

Attest:

JAMES E. ROGAN
Attesting Officer
Director of the United States Patent and Trademark Office